United States Patent
Hosonuma

(10) Patent No.: US 6,680,789 B2
(45) Date of Patent: Jan. 20, 2004

(54) OPTICAL SCANNING DEVICE

(75) Inventor: Tasuku Hosonuma, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/154,974

(22) Filed: May 28, 2002

(65) Prior Publication Data

US 2002/0181065 A1 Dec. 5, 2002

(30) Foreign Application Priority Data

May 30, 2001 (JP) ........................................ 2001-162108

(51) Int. Cl.[7] ................................................. G02B 26/08
(52) U.S. Cl. ........................................ 359/216; 359/217
(58) Field of Search ................................. 359/196, 197, 359/216, 217, 212, 855

(56) References Cited

U.S. PATENT DOCUMENTS

| | | | | |
|---|---|---|---|---|
| 5,438,447 A | * | 8/1995 | Kunii | 359/200 |
| 5,671,081 A | * | 9/1997 | Hisa | 359/216 |
| 5,726,699 A | * | 3/1998 | Itami et al. | 347/257 |
| 6,424,447 B1 | * | 7/2002 | Kaneko et al. | 359/216 |

FOREIGN PATENT DOCUMENTS

| | | |
|---|---|---|
| JP | A 6-331919 | 12/1994 |
| JP | A 10-148784 | 6/1998 |
| JP | A 2000-284208 | 10/2000 |

* cited by examiner

*Primary Examiner*—Euncha Cherry
(74) *Attorney, Agent, or Firm*—Oliff & Berridge, PLC

(57) ABSTRACT

An optical scanning device comprises a rotary polygonal mirror which performs deflection scanning of a light beam emitted from a light source; and an annular member which is disposed around the rotary polygonal mirror in proximity thereto and which has a width extending generally in a diameter of the rotary polygonal mirror.

5 Claims, 5 Drawing Sheets

OPTICAL SCANNING DEVICE

BACKGROUND OF THE INVENTION

1. Field of the Invention

The present invention relates to an optical scanning device which performs high speed deflection scanning of a light beam such as a laser light or the like in an image forming apparatus such as a laser printer or the like.

2. Description of the Related Art

The principle of an optical scanning device of this kind will be explained with reference to FIG. 9. A laser beam (light beam) L emitted from a laser beam generator (light source) 1 passes through a cylindrical lens 2 to be collimated into a predetermined beam shape, and the collimated laser beam L is incident on reflecting facets of a rotary polygonal mirror 3 with a regular polygonal shape rotating in the direction of an arrow to be deflection-scanned repeatedly, so that the scanned light is focused on a member 5 to be scanned through imaging lens systems 4a and 4b.

In such an optical scanning device, however, it is known that a whirring sound from the rotary polygonal mirror is transmitted to the outside as noise. It is believed that the noise occurs because the rotary polygonal mirror has a regular polygonal shape, an air flow towards an outer peripheral direction occurs around the rotary polygonal mirror due to a difference in peripheral velocity during rotation of the polygonal mirror between corner sections and flat reflecting facets thereof (the corner portion has a peripheral velocity larger than that of the reflecting facet), and further, because the air flow develops into a turbulent flow. In recent years, since a rotary polygonal mirror which rotates at a high speed such as ten and several thousand rpm to twenty thousand rpm or more according to a high speed orientation of a processing speed is provided, the noise tends to increase. Therefore, various measures for suppressing noise generation have been taken.

As these measures, there is a structure in which noise is isolated by covering a rotary polygonal mirror with a cover (for example, disclosed in JP-A Publication No. 06-331919), a structure where noise is reduced by a cylindrical member provided around a rotary polygonal mirror (for example, disclosed in JP-A Publication No. 10-148784), and the like. Also, as a structure in which a member is provided around a rotary polygonal mirror, the present applicant has proposed an optical scanning device where a cylindrical member having a corrugated inner surface undulated in a rotating direction is arranged around the rotary polygonal mirror, as known from JP-A Publication No. 2000-284208.

A conventional art which isolates noise by covering a rotary polygonal mirror with a cover is not constructed so as to cancel an turbulent flow of air which is a noise source, but a problem occurs in the art in which the turbulent of air is generated and vibrates the cover. Also, like the above, even when a cylindrical member is arranged around a rotary polygonal mirror, there is a possibility that noise and/or vibrations due to a new air flow may be generated by the cylindrical member. On the other hand, the above conventional art of the present applicant is directed to suppressing rotation unevenness of the rotary polygonal mirror, but it cannot be expected that a noise suppressing effect will be achieved by the conventional art.

SUMMARY OF THE INVENTION

Accordingly, an object of the present invention is to provide an optical scanning device which can suppress noise generated from a rotary polygonal mirror effectively, thereby allowing a high speed orientation sufficiently.

The present invention, which has been made for achieving the above object, comprises a rotary polygonal mirror which performs deflection scanning of a light beam emitted from a light source, and an annular member which is arranged around the rotary polygonal mirror in proximity thereto and which has a width extending generally in a diametrical direction of the rotary polygonal mirror.

According to the present invention, an air flow generated around the rotary polygonal mirror according to rotation of the rotary polygonal mirror strikes on the annular member to be split and rectified. That is, since the air flow is split and rectified before it develops into a turbulent flow, occurrence of a turbulent flow becomes difficult so that noise occurrence is suppressed.

In order to split an air flow securely, the annular member according to the present invention is preferably formed in a shape having a fixed width extending in a diametrical direction of the rotary polygonal mirror, and, for example, a flat ring can be employed as the annular member. Therefore, an edge on a side of an inner diameter of such an annular ring, i.e., an inner peripheral edge of ring opposed to the rotary polygonal mirror, is formed concentrically with the rotary polygonal mirror, and the relationship between a radius r of the inner peripheral edge and a diameter d of the circumscribed circle of the rotary polygonal mirror preferably meets $r/d=0.6$ to $1$, more preferably, $r/d=0.6$ to $0.7$. It has been determined experimentally that the turbulent flow occurs in a range of $r/d=0.6$ to $1$ around the rotary polygonal mirror, and it is therefore desirable to arrange the inner peripheral edge of the annular ring in the range for suppressing occurrence of a turbulent flow.

Also, in order to secure a function of splitting an air flow, it is preferable that the annular member be disposed almost at a center in a direction of the height of the reflecting facet of the rotary polygonal mirror. When the annular member is arranged so as to be positioned eccentrically to one side in the direction of the height of the reflecting facet of the rotary polygonal mirror, there is a possibility that an air flow in a space positioned on the other side where the annular member is not disposed may develop into a turbulent flow, and it is therefore difficult to achieve an effective splitting function of the air flow. Furthermore, such an aspect in which the sectional configuration of the annular member is formed in an almost wedge shape where the annular member has an acute angle on the inner peripheral edge can preferably be employed because the air splitting function can be ensured.

Furthermore, the number of the annular members may be one or may be more than one. In the case of using plural annular members, when such a structure is adopted in which these annular members are disposed at intervals in the direction of the height of the reflecting facet of the rotary polygonal mirror in a stacked manner, an air flow is split and rectified finer so that improvement in noise suppressing effect can be achieved. In the case in which the plural annular members are arranged in a stacked manner, when the annular members are arranged in the stacked manner such that the radiuses r of the inner peripheral edges of adjacent annular members are different from each other within the range of $r/d=0.6$ to $1$ in the relationship between the radius r and the diameter d of the circumscribed circle of the rotary polygonal mirror, namely, the inner diameters of adjacent annular members are different from each other, an air flow can be received on faces of the annular members exposed to the rotary polygonal mirror so that the rectifying effect can further be improved.

Also, in the aspect where the plural annular members are arranged in the stacked manner, the sectional configuration of at least one of the annular members may be formed in an almost wedge shape. In this case, since an air flow path between an annular member with a wedge-shaped sectional configuration and an annular member adjacent thereto (this member may also have a wedge-shaped sectional configuration) is gradually narrowed, and an air flow is made thinner in a pressing manner so that its development into a turbulent flow is suppressed.

Furthermore, the annular member of the present invention includes one that it is formed in a spiral shape. In this case, an air flow occurring around the rotary polygonal mirror is split by the plural annular members arranged along the direction of the height of the reflecting facet of the rotary polygonal mirror to be passed through a spiral groove between the annular members so that a rectifying effect can be achieved.

BRIEF DESCRIPTION OF THE DRAWIGNS

DESCRIPTION OF THE PREFERRED EMBODIMENTS

Figure 1A:
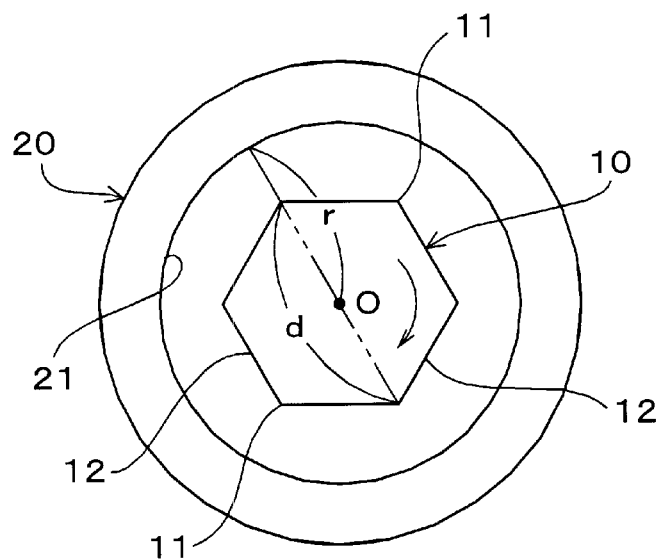
FIGS. 1A and 1B are a plan view and a side sectional view of an optical scanning device according to a first embodiment of the present invention.
Figure 1B:
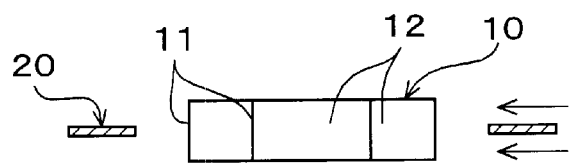

Embodiments of the present invention will be explained below with reference to the drawings.
(1) First Embodiment
FIGS. 1A and 1B are a plan view and a side view showing an optical scanning device according to a first embodiment which is applicable to the optical system shown in FIG. 9. The device is provided with a rotary polygonal mirror 10 which has a regular polygonal shape in plan view (a regular hexagon in the illustrated embodiment), and which has an appropriate height (thickness), and a ring (an annular member) 20 arranged around the rotary polygonal mirror 10. A plurality of flat reflecting facets 12 partitioned by corner portions 11 are formed on a peripheral surface of the rotary polygonal mirror 10. The rotary polygonal mirror 10 is rotatably mounted about a center O within a casing (not shown), and is rotated, for example, in a direction of the arrow by a driving motor (not shown).

The ring 20 is arranged around the rotary polygonal mirror 10 concentrically with the rotary polygonal mirror 10. The ring 20 is a flat ring which is considerably thinner than the rotary polygonal mirror 10 and has a fixed width in a direction of the diameter of the rotary polygonal mirror 10, and it is arranged horizontally at a center in the direction of the height of the reflecting facet 12 of the rotary polygonal mirror 10, namely at a position of just one-half of the height. Here, as shown in FIG. 1A, assuming that the radius of the inner diameter (an inner peripheral edge 21) of the ring 20 is defined as r and the diameter of the circumscribed circle of the rotary polygonal mirror 10 is defined as d, r is set to a size so that r/d=0.6 to 0.7.

In this embodiment, an optical path of a laser beam which is incident on the reflecting facets 12 of the rotary polygonal mirror 10 to be deflection-reflected thereby is caused to pass through one of upper and lower sides of the ring 20, as shown in FIG. 1B. Also, in the case in which there are two optical paths, laser beams are caused to pass through spaces above and below the ring 20, respectively. Therefore, the ring 20 can be constituted with an endless member closed along the entire periphery of the rotary polygonal mirror 10, as shown in FIG. 1A. Also, in order to secure the optical path, the ring 20 is supported to the casing in a floating manner via a plurality of thin rod-shaped members arranged so as to bypass the optical path.

Figure 9:
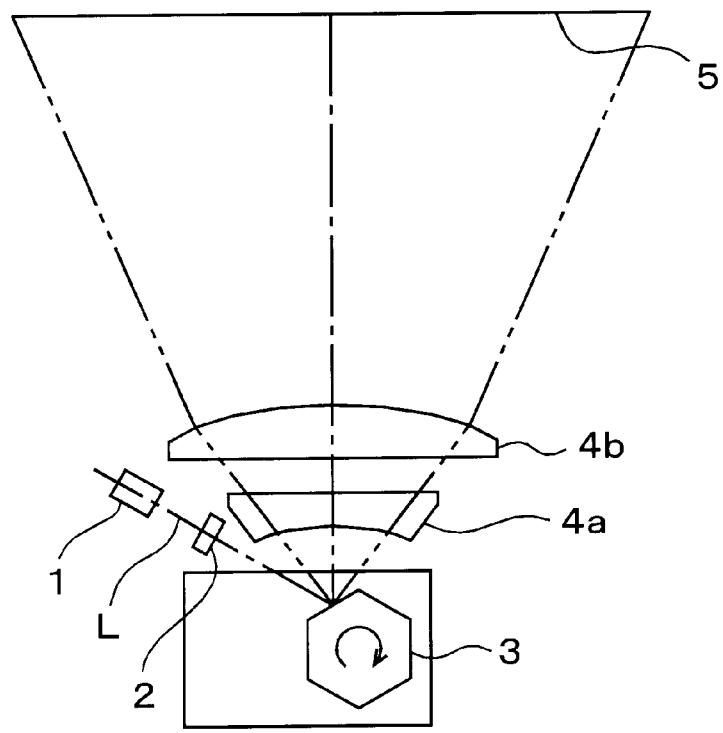
FIG. 9 is a conceptual diagram for explaining the principle of an optical scanning device.

According to the optical scanning device according to the present embodiment, like in the case shown in FIG. 9, while the rotary polygonal mirror 10 is being rotated, a laser beam emitted from a laser beam generator is incident on the reflecting facets 12 of the rotary polygonal mirror 10 to be scanned repeatedly in a deflecting manner and to be imaged on a member to be scanned through an imaging lens system.

In such an operating state around the rotary polygonal mirror 10, an air flow towards an outer peripheral direction occurs due to a difference in peripheral velocity between the corner portions 11 and the reflecting facets 12, as described above, but the air flow strikes the ring 20 to be split into an upper flow and a lower flow and is rectified. Assuming that there is no ring 20, the air flow will soon develop into a turbulent flow, generating noise. In this embodiment, however, since the air flow is split and rectified by the ring 20 before it develops into a turbulent flow, a turbulent flow becomes difficult to occur. In particular, since the inner peripheral edge 21 of the ring 20 is positioned within the range of r/d=0.6 to 0.7 where a turbulent flow will occur easily, a function for suppressing occurrence of a turbulent flow can be securely obtained. Furthermore, the ring 20 is an endless member without a gap, and it is disposed at a center in the height of the rotary polygonal mirror 10, so that the air flow is split into an upper flow and an lower flow over the entire periphery of the rotary polygonal mirror 10 securely and uniformly and is rectified. Occurrence of noise due to rotation of the rotary polygonal mirror 10 can be suppressed effectively according to these functions.

Figure 2:
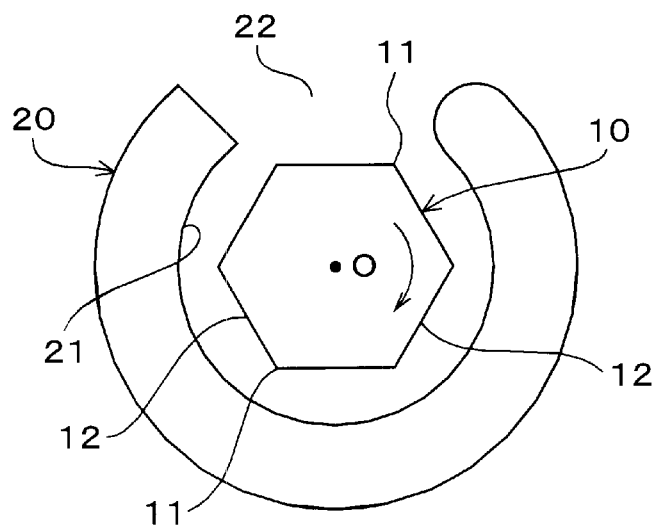
FIG. 2 is a plan view showing a case where a window is formed in a ring in the optical scanning device according to the first embodiment of the present invention.

In the above-described embodiment, the optical path of a laser beam passes through either one of spaces above and below the ring 20 (in case of two optical paths, both the spaces above and below the ring 20), but the ring 20 serves as an obstacle when a laser beam is incident on the center of the rotary polygonal mirror 10 in the height thereof. In this case, a structure can be employed in which a window portion 22 is formed in the ring 20 to secure the optical path, as shown in FIG. 2. Incidentally, in this case, an end portion of the ring 20 positioned on a side opposing to a rotation direction of the rotary polygonal mirror 10 (on the right side in FIG. 2) is formed in an R shape (a streamlined shape) such that an air flow occurring from the rotary polygonal mirror 10 turns aside so as not to cause turbulence.

The above-described first embodiment is directed to an embodiment in which a ring has been provided around the rotary polygonal mirror 10 in a single layer manner, and modified embodiments of such a single layer ring will be explained below with reference to FIGS. 3 to FIG. 5A.

Figure 3:
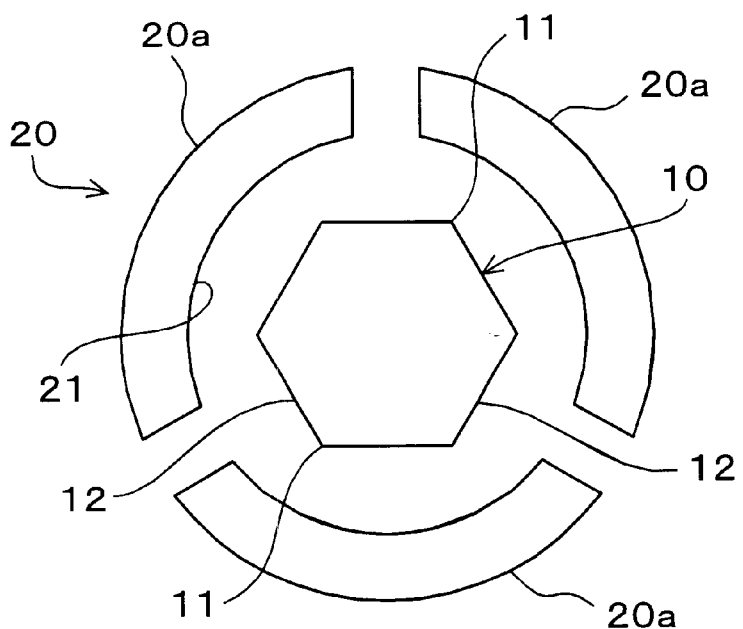
FIG. 3 is a plan view of a modified embodiment where a ring is provided with a plurality of divided pieces in the optical scanning device according to the first embodiment of the present invention.
Figure 4:
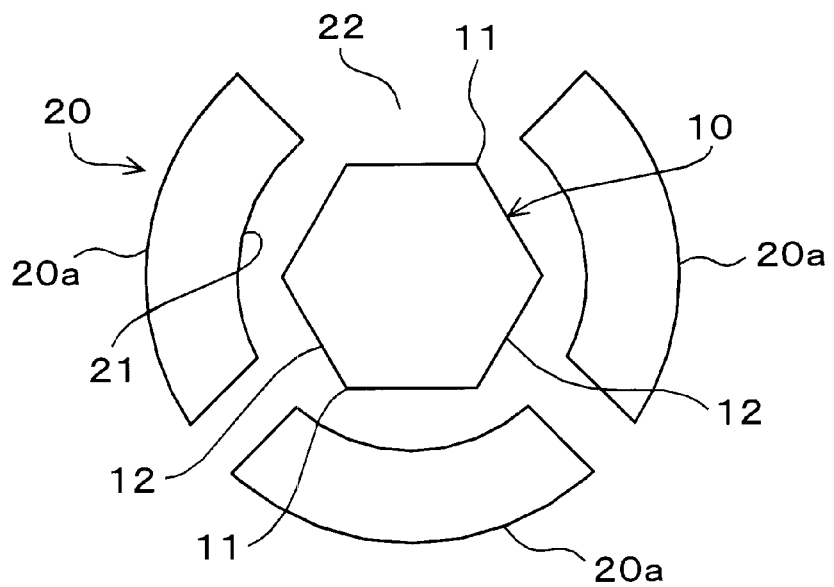
FIG. 4 is a plan view of another modified embodiment where a ring is constituted with a plurality of divided pieces in the optical scanning device according to the first embodiment of the present invention.

In a modified embodiment shown in FIG. 3, one ring 20 is constituted as a whole by arranging a plurality of (three in the illustrated modified embodiment) fan-shaped or arc-shaped ring fragment pieces 20a with an equal circumferential length at equal intervals. In a modified embodiment shown in FIG. 4, one ring 20 is constituted as a whole by arranging a plurality of fan-shaped ring fragment pieces 20a at equal intervals like the above and a window 22 for an optical path is secured like the ring 20 shown in FIG. 2. For example, when each of these rings 20 cannot be formed in an endless shape which does not have any gap such as the ring 20 of FIG. 1 because it would interfere with a piece of peripheral equipment, such an interference can be avoided by positioning a space between the ring fragment pieces 20a at the interfering portion. Accordingly, the number of the ring fragment pieces 20a or a distance between adjacent ring fragment pieces 20a can be set arbitrarily as necessary.

Figure 5A:
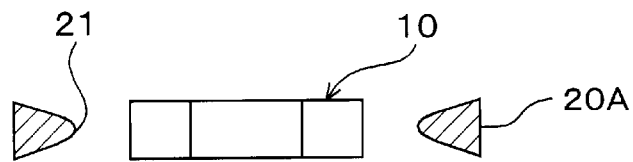
FIGS. 5A and 5B are side sectional views of modified embodiments which are respectively provided with rings with different sectional configurations in the optical scanning device according to the first embodiment of the present invention.
Figure 5B:
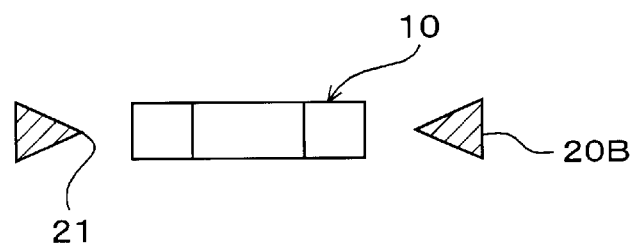

Also, a ring 20A shown in FIG. 5A is formed so as to have a wedge-shaped sectional configuration whose thickness is made thinner towards its inner periphery and whose inner peripheral edge 21 at its tip end is formed in a round shape. A ring 20B shown in FIG. 5B is formed so as have a wedge-shaped sectional configuration whose thickness is made thinner towards its inner periphery like the above, but an inner peripheral edge 21 of the ring 20B at a tip end is formed in a sharp shape. Since the ring in each embodiment is formed in a streamlined shape extending from the inner peripheral side towards the outer peripheral side, an air flow generated around the rotary polygonal mirror 10 is split smoothly and uniformly by the ring 20A (20B) and is rectified. Accordingly, an effect of suppressing noise generation following generation of an turbulent flow is further enhanced. Furthermore, in the case of such a streamlined shape, improvement of the rigidity of the ring 20A (20B) can be achieved, and vibrations generated due to the ring receiving an air flow from the rotary polygonal mirror 10 or the like can be suppressed effectively. Incidentally, each of the rings 20A and 20B shown in FIGS. 5A and 5B has the same thickness as that of the rotary polygonal mirror 10, and it has an endless shape closed over the entire periphery thereof like the ring 20 shown in FIG. 1, where an optical path cannot be secured. Therefore, it is necessary to form a window portion for securing an optical path, as shown in FIG. 2.

(2) Second Embodiment

In the above-described first embodiment, the number of rings provided as the annular ring according to the present invention is one (a single layer). However, a second embodiment where a plurality of annular members are provided in a stacked manner will be explained below.

Figure 6A:
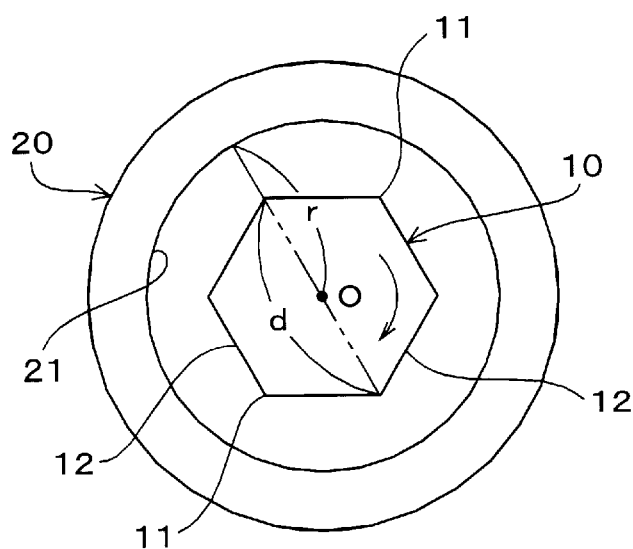
FIGS. 6A and 6B are a plan view and a side sectional view of an optical scanning device according to a second embodiment of the present invention.
Figure 6B:
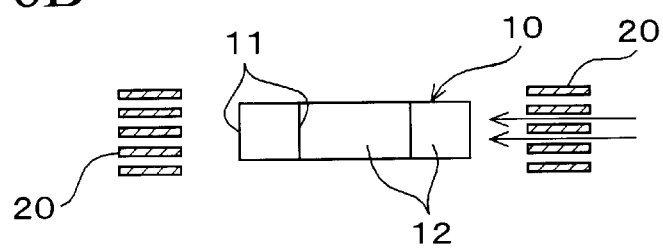

FIGS. 6A and 6B are a plan view and a side view of an optical scanning device according to a second embodiment. In this device, a plurality of (five in this case) rings 20 which have been used in the first embodiment are arranged around a rotary polygonal mirror 10 horizontally at equal intervals in a stacked manner. The ring 20 positioned at a center is positioned at a center in the direction of the height of the reflecting facet 12 of the rotary polygonal mirror 10, and the stacked height defined by all the rings 20 arranged in the stacked manner is slightly larger than the size of the height of the reflecting facet 12 of the rotary polygonal mirror 10. Each ring 20 is arranged concentrically with the rotary polygonal mirror 10 like in the first embodiment, and the relationship between the radius r of an inner peripheral edge 21 of each ring 20 and the diameter d of a circumscribed circle of the rotary polygonal mirror 10 meets r/d=0.6 to 0.7 like in the first embodiment.

Also, in this case, an optical path of a laser beam which is incident on the reflecting facets 12 of the rotary polygonal mirror 10 to be deflection-reflected thereby extends through one of the gaps defined between a central ring 20 and upper and lower rings 20 adjacent thereto, as shown by one of the arrows in FIG. 6B. Also, in a case in which there are two optical paths, light beams will be caused to pass through these gaps. Accordingly, each of the rings 20 can be constituted with an endless member closed over the entire periphery, as shown in FIG. 6A. Also, in order to secure an optical path, the respective rings 20 are connected to one another by thin rod-shaped members arranged so as to bypass the optical path and they are supported by a casing through these rod-shaped members in a floating manner. Incidentally, when it is difficult to define the optical path between the rings 20, a window portion for securing the optical path can be formed in the respective rings 20, as shown in FIG. 2.

According to the structure where a plurality of rings 20 are arranged at intervals around the rotary polygonal mirror 10 in a stacked manner like in this embodiment, an air flow generated around the rotary polygonal mirror 10 is split more finely by the plurality of rings 20 to be rectified. Therefore, an air flow hardly develops into an turbulent flow so that a noise suppressing effect is further improved.

Figure 7A:
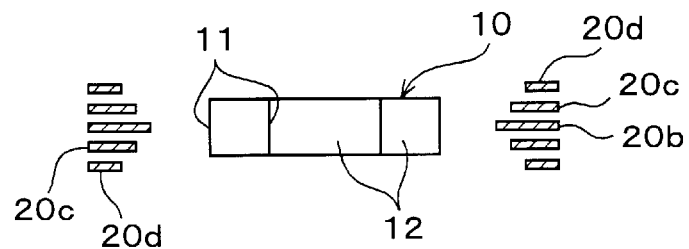
FIGS. 7A to 7E are side sectional views of modified embodiments according to the second embodiment of the present invention.
Figure 7B:
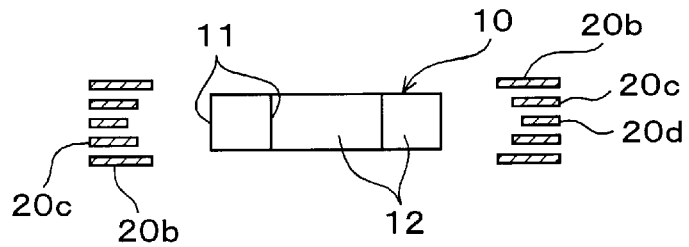
Figure 7C:
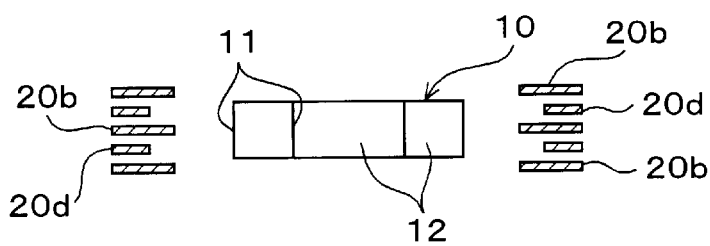
Figure 7D:
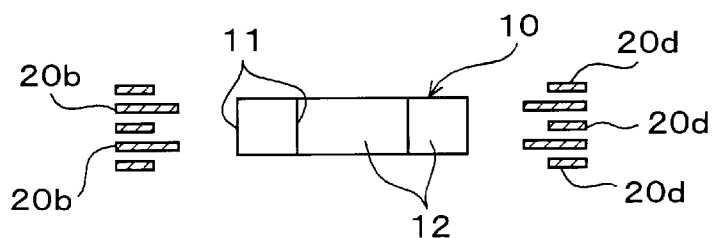

Next, modified embodiments of the second embodiment where the number of rings arranged in a stacking manner is plural will be explained with reference to FIGS. 7A to 8.

In modified embodiments shown in FIGS. 7A to 7D, five rings including plural kinds of rings which have different inner peripheral edge radiuses, that is, have the same outer diameter but have different inner diameters, are arranged at equal intervals in a stacked manner. In the modified embodiment shown in FIG. 7A, three kinds of rings are used, where the inner diameter of a center ring 20b is the smallest, the inner diameters of rings 20c positioned on both sides thereof are larger than that of the center ring 20b, and the inner diameters of the outermost upper and lower rings 20d are the largest. In the modified embodiment shown in FIG. 7B, in contrast with the case shown in FIG. 7A, rings 20b to 20d are arranged in a stacked manner such that their inner diameters are gradually made smaller from the center upwardly and downwardly. Also, in the modified embodiment shown in FIG. 7C, three rings 20b having the smallest inner diameter and two rings 20d having the largest inner diameter are alternately arranged in a stacking manner. In the modified embodiment shown in FIG. 7D, in contrast with the case shown in FIG. 7C, three rings 20d having the largest inner diameter and two rings 20b having the smallest inner diameter d are alternately arranged in a stacked manner.

Each of the rings 20b, 20c and 20d shown in FIGS. 7A to 7D is set such that the relationship between the radius r of its inner peripheral edge and the diameter of the circumscribed circle of the rotary polygonal mirror 10 satisfies r/d=0.6 to 0.7. That is, rings positioned adjacent to each other vertically are disposed in a stacked manner such that radiuses r of their inner peripheral edges are different from each other within the range of r/d=0.6 to 1 where the radius of the ring is r and the diameter of the circumscribed circle of the rotary polygonal mirror 10. According to such a stacking aspect, an air flow generated around the rotary polygonal mirror 10 can be received on faces of faces of the respective rings 20b and 20c exposed on the inner peripheral side (on the side of the rotary polygonal mirror 10) so that a rectifying effect can be further improved.

Figure 7E:
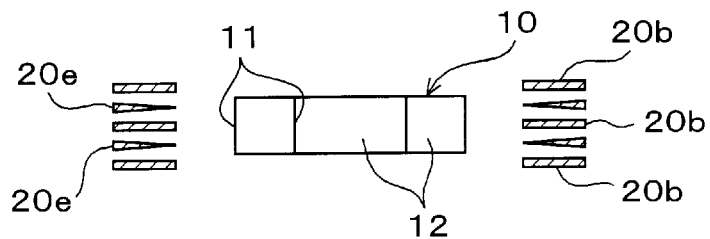

In a modified embodiment shown in FIG. 7E, the above three rings 20b and wedge-shaped rings 20e which have an inner diameter equal to that of the ring 20b and whose sectional configuration is acute on an inner peripheral side are alternately arranged in a stacked manner. In this aspect, since an air flow between the ring 20e with a wedge-shaped sectional configuration and the ring 20b adjacent thereto is gradually narrowed, the air flow is thinned in a compressing manner to be suppressed from developing into a turbulent flow.

Figure 8:
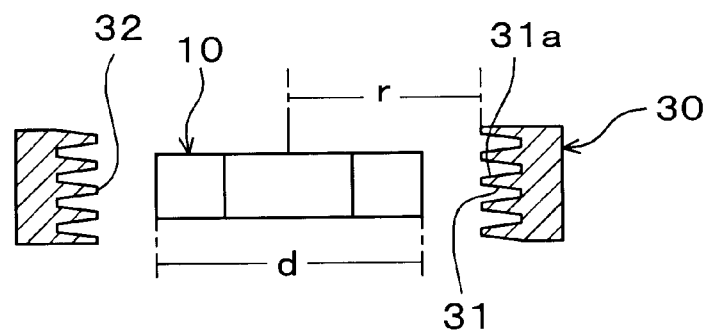
FIG. 8 is a side sectional view of another modified embodiment according to the second embodiment of the present invention.

In a modified embodiment shown in FIG. 8, a cylindrical body 30 is arranged around a rotary polygonal mirror 10. The cylindrical member 30 has a height slightly higher than that of the rotary polygonal mirror 10, and it is arranged coaxially with the rotary polygonal mirror 10 such that the center of the cylindrical body 30 is coincident with the center of the rotary polygonal mirror 10. A rib (annular member) 31 with a wedge-shaped section which is gradually made thinner towards its inner peripheral side is formed spirally on an entire inner peripheral surface of the cylindrical body 30. Assuming that the radius of an inner peripheral edge 32 of the rib 31 is defined as r and the diameter of the circumscribed circle of the rotary polygonal mirror 10 is defined as d, r is set to a size sutisfying r/d=0.6 to 0.7. Incidentally, in this case, it is necessary to form a window portion in the cylindrical body 30 for securing an optical path such as shown in FIG. 2.

In this modified embodiment, since the rib 31 is spiral, only one rib has been formed in a circumferential direction of the cylindrical body. However, it is believed that this spiral arrangement of the rib is substantially equivalent to a case that a plurality of ribs 31 are provided at equal intervals in a stacked manner. Therefore, air flows generated around the rotary polygonal mirror 10 are split more finely by the plurality of ribs 31 arranged in a vertical direction and pass through a spiral groove 31a between adjacent ribs 31 upwardly and downwardly to the outside. According to this modified embodiment, an air flow hardly develops into a turbulent flow owing to the plurality of ribs 31 so that a noise suppressing effect can further be improved.

What is claimed is:

1. An optical scanning device comprising:
    a rotary polygonal mirror which performs deflection scanning of a light beam emitted from a light source; and
    an annular member which is disposed around the rotary polygonal mirror in proximity thereto and which has a plate-like shape extending generally in a diameter of the rotary polygonal mirror,
    wherein an inner peripheral edge of the annular member opposed to the rotary polygonal mirror is formed concentrically with the rotary polygonal mirror, and the relationship between the radius r of the inner peripheral edge and the diameter d of the circumscribed circle of the rotary polygonal mirror meets r/d=0.6 to 1, and
    the annular member is arranged generally at a center in the direction of height of a reflecting facet of the rotary polygonal mirror.

2. An optical scanning device according to claim 1, wherein the annular member is provided in a plural number, and the plural annular members are arranged in a stacked manner at intervals in the direction of height of the reflecting facet of the rotary polygonal mirror.

3. An optical scanning device according to claim 1, wherein the sectional configuration of the annular member is formed in an almost wedge shape which is acute on its inner peripheral edge side.

4. An optical scanning device according to claim 2, wherein at least one annular member of the plurality of the annular members arranged in the stacked manner is formed in an almost wedge-shaped sectional configuration.

5. An optical scanning device according to claim 1, wherein the annular member is formed in a spiral shape.

* * * * *